United States Patent

[11] 3,547,079

| [72] | Inventor | Alice Mae Bassett<br>Star Rte. Box 284, Hemet, Calif. 92343 |
|---|---|---|
| [21] | Appl. No. | 755,915 |
| [22] | Filed | Aug. 28, 1968 |
| [45] | Patented | Dec. 15, 1970 |

[54] PET BAG WITH ACCESS OPENING
3 Claims, 4 Drawing Figs.

[52] U.S. Cl. .................................................... 119/1,
119/96; 128/134
[51] Int. Cl. ..................................................... A01k 29/00
[50] Field of Search .......................................... 119/1, 96,
156, 160; 36/2.5; 150/34, 11; 128/134

[56] References Cited
UNITED STATES PATENTS

| 1,207,533 | 12/1916 | Gamble | 150/11X |
|---|---|---|---|
| 2,471,701 | 5/1949 | Post | 119/97X |
| 2,536,943 | 1/1951 | Kessel | 119/1 |
| 2,722,694 | 11/1955 | Bryant | 128/134X |
| 2,969,767 | 1/1961 | Bassett | 119/1 |
| 3,150,640 | 9/1964 | Nevitt | 119/96 |
| 3,322,176 | 5/1967 | Geller | 150/1.7 |

*Primary Examiner*—Aldrich F. Medbery
*Attorney*—Clarence A. O'Brien and Harvey B. Jacobson

ABSTRACT: A liquid impervious sheet material bag adapted to confine a pet so that it can be comfortably and safely carried to a veterinarian. The forward upper portion has a collar-like opening with stringlike neck encircling ties. The top wall and rear wall has an entrance and exit slot. The rear portions of the sidewalls are provided with zipper-equipped hand holes for temperature taking and convenient hypodermic needle injections. The basal or lower portion is expansible and contractible and is equipped with manually regulatable volume diminishing and restraint means.

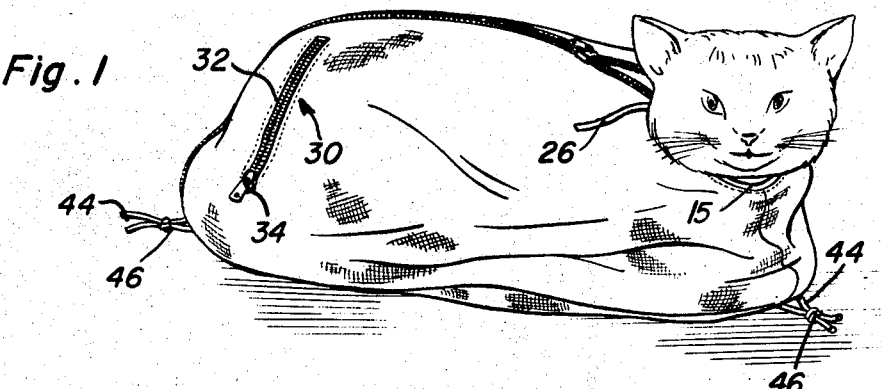
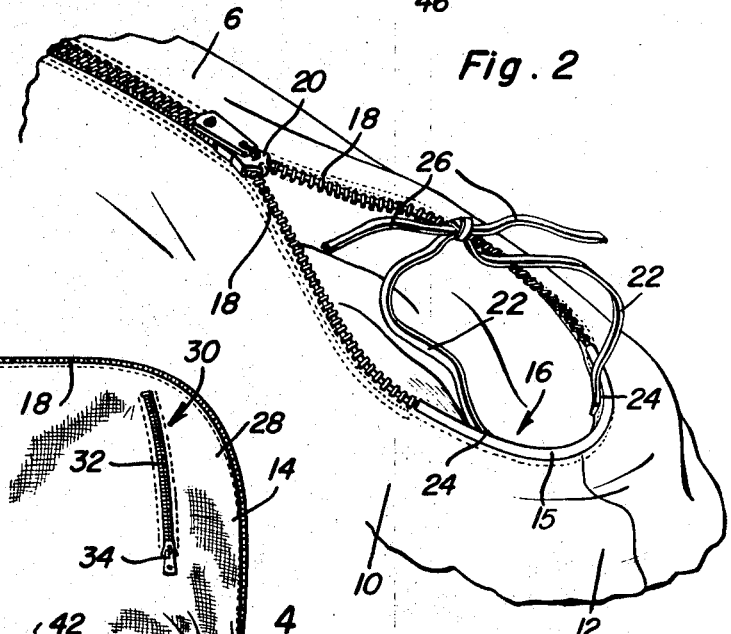
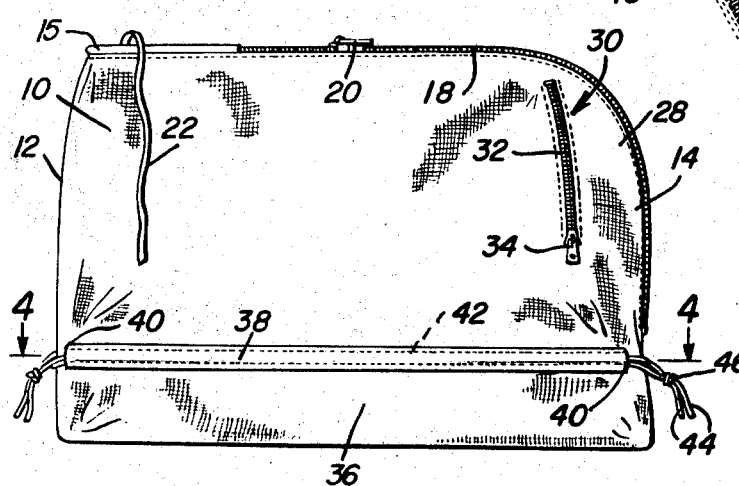
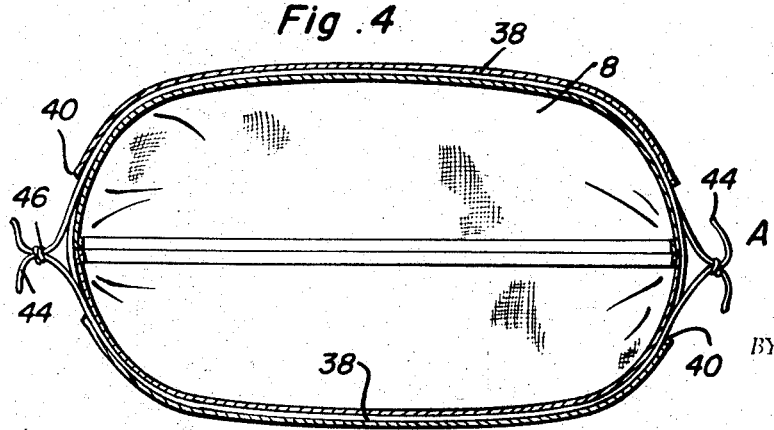
Alice Mae Bassett
INVENTOR.

PET BAG WITH ACCESS OPENING

This invention relates to certain new and useful improvements in a pet jacketing, temporary restraining and handling bag which is expressly but not necessarily designed and adapted to confine a cat while it is being transported or carried to a veterinarian and in which the cat can be conveniently confined, if desired, for examination and treatment.

By way of introduction it is to be pointed out that the present invention is an improvement on my U.S. Pat. No. 2,969,767. Reference to the stated patent will show that it is characterized by an elongate bag having bottom, top, sides and front and rear portions. The front portion is permanently closed. The bag has a lengthwise opening therein extending along the top portion and also partway along the rear end for insertion of a pet therethrough into the bag, said bag having opposite edges forming said opening and extending from the closed front end. A slide fastener, commonly referred to as a zipper, is mounted on the edges and serves to open and close the entrance opening. The entrance opening communicates at its forward end with a collarlike opening for the head and neck of the pet and this allows the pet to extend its head outwardly through and beyond the opening. Strap means is secured to the edges at the closed end of the bag to assist in tying the animal's head in the bag.

An object of the present invention is to structurally, functionally and in other ways improve upon the above-named U.S. Pat. No. 2,969,767 and any other similarly constructed and performing cat and pet bags.

More specifically, one improvement resides in providing the median and upper portions of the sidewalls of the bag with left and right or selectively usable handholes. Each hole comprises a slot of requisite length which is just forwardly of the rear wall. It is so located and of a size that it can be used to permit the veterinarian to obtain convenient access to the rectal area of the animal for purposes of taking temperature or, alternatively, for injecting a hypodermic or other sedative into the large muscle of the animal's hindquarter.

Another feature of the invention has to do with the provision of a pair of drawstrings which have their ends knotted or otherwise connected together and accessibly arranged at the front and rear ends of the bag and which have their major portions threaded and slidingly mounted in open-ended hems mounted on the lower exterior surface portions of the two sidewalls of the bag. These drawstrings make it possible to convert the bag from one which may be described as roomy for the confined pet or to be gathered and restricted at the lower portion in a manner to properly diminish the volume and to assist in inserting an excited pet into the bag and, where necessary, diminishing the major upper portion of the bag for snug restraint and retention of the pet.

Briefly the upper forward portions of the sidewalls and the corresponding forward portion of the top wall is provided with a first opening. This opening is wholly or partly bordered by a suitable smooth finished bead which functions as a collar and which is adapted to encompass the neck of the captive pet while at the same time permitting the head of the pet to protrude forwardly through and freely beyond the opening. The top wall and major median portion of the rear wall has a second opening ranging lengthwise from the first opening and along the top wall. This opening terminates at a rearward end portion and a distance above the level of the bottom wall. It is differentiated as an openable and closable slot and affords access to the pouch portion of the bag by way of which the pet can be readily inserted and removed. Slide fastening means is provided for opening and closing this slot and is commensurate in length with the overall length of the slot. The marginal edge of the first opening is not only smooth finished but is provided with a pair of suitable manually connectable and separable flexible neck-encircling ties which have like ends joined to the bead and yoke so that the free ends can be readily united and tied in any manner desired at will. The rearward median portion of at least one sidewall (preferably both sidewalls) is provided with an openable and closable treatment slot which provides convenient access when intentionally opened for convenient access to the animal's hindquarter for injection and for temperature taking or other examination purposes. Then, too, the respective lower sidewalls are provided with open-ended longitudinal hems to accommodate elongated drawstrings. These drawstrings are threaded through the hems and have their ends knotted together and with this construction and arrangement the entire bottom portion of the bag can be gathered, whereby to diminish the volume and in so doing to facilitate the step of placing the animal in the pouch and either restraining the gathered portion or loosening it, depending on the conditions at hand.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a pet bag constructed in accordance with the invention and showing the same readied and in use;

FIG. 2 is an enlarged fragmentary perspective view the purpose of which is to emphasize the construction of the yoke and tying strings and how they cooperate;

FIG. 3 is a side-elevational view which shows one of the aforementioned hems and also one of the zipper-equipped handholes or slots adjacent the rear end wall; and FIG. 4 is a horizontal section taken approximately on the plane of the section line 4-4 of FIG. 3.

Referring now to the views of the drawing the elongated pet jacketing and transporting and restraining bag is made of suitable flexible liquid impervious sheet material and it is characterized by a top wall 6, a bottom wall 8, sidewalls 10, a front transverse connecting wall 12 and a rear transverse connecting wall 14. The upper forward portions of the sidewalls and corresponding forward portion of the top wall is provided with a first opening which is denoted generally stated at 16 in FIG. 2. A substantial part of the edge of this opening is provided with a smooth finished bead 15. The top wall and median portion of the rear wall is provided with a second opening which ranges lengthwise from the first or collar opening along said top wall and terminates at a rearward end a predetermined distance above the level of the bottom wall. The marginal edges of this opening are provided with cooperating tracks 18 which function to accommodate a slide fastener 20. This openable and closable slot acting in conjunction with the neck or collar opening 16 facilitates the step of placing the pet in the pouch or receptacle portion of the bag. The elongate flexible tying elements or tapes 22 have forward end portions 24 which are connected to median portions of the collar bead 15. The coacting free end portions 26 are connectable to facilitate maintaining the collar in its closed position in the manner shown in FIG. 1 in particular. The rearward median and upper portions of the sidewalls (both left and right sidewalls) 28 are provided with access openings which are referred to conveniently as and each of which is denoted generally at 30 and the edges thereof having tracks 32 to accommodate a slide fastener 34. These hand holes 30 may be said to be zipper actuated. These handholes run parallel with the rearward end portion of the main opening and are there to conveniently permit the veterinarian to insert his hand into either selected opening at the rear of the bag to allow the animal's temperature to be taken, this being done as usual through the rectum. These zipper-controlled openings or handholes are also convenient for insertion and removal of a hypodermic needle which can be used for injection of a sedative into the large muscle of an animal's hindquarter. It would be within the purview of the invention to provide other zipper-controlled openings (not shown) elsewhere on the side or end walls.

The respective lower portions 36 of the sidewalls 10 are provided exteriorly with hems 38 whose ends 40 terminate short of the respective vertical or front and rear end walls of the overall bag. These individual open ended hems serve to accommodate the major portions 42 of drawstrings. The drawstrings are of a length greater than the hems and the extending end portions 44 can be knotted or tied together at 46. These hems and slidingly attached drawstrings provide volume diminishing and restraint means and serve to contract or constrict the lower bottom portion of the bag so that the bag can be converted from a roomy pouch form to a more restricted form for whatever purpose is desired. Usually it has been found desirable to gather and contract the lower or basal portion of the bag at the time of placing the pet into the pouch and to put the pet more at ease as experience has repeatedly shown.

By contrast with the aforementioned prior U.S. Pat. No. 2,969,767 on which the instant bag is an improvement it will be noted that the collar 16 is improved and provides a more satisfactory ways and means of attaching the tapes or ties 22 which are used to encircle the neck in the manner shown in FIG. 1. The zipper-equipped handholes or slots 30 at the left and right of the rearward upper sidewalls also increase the efficiency of the overall bag. Then too and as already suggested the provision of the hems and drawstrings provide novel volume diminishing and restraint means and make it possible to gather in a significant lower portion of the bag and in this manner to assist in inserting, removing and controlling the confined pet. It follows therefore that the invention well serves the overall purposes for which it has been devised.

The foregoing is considered as illustrative only of the principles of the invention. Further, since numerous modifications and changes will readily occur to those skilled in the art, it is not desired to limit the invention to the exact construction and operation shown and described.

I claim:

1. An elongated pet jacketing, transporting and temporary restraining bag made of flexible liquid impervious sheet material and embodying complemental bottom, top, opposite sidewalls, front and rear end walls and providing a full fashion captive pouch for said pet, the upper forward portions of said sidewalls and corresponding forward portion of said top wall being provided with a first opening constituting a collar which is adapted to encompass the neck of the captive pet and to permit the head of the pet to protrude forwardly through and freely beyond said first opening, said top wall and major median portion of the rear wall having a second opening ranging lengthwise from said first opening along said top wall and terminating at a rearward end a predetermined distance above the level of said bottom wall, said second opening providing an openable and closable slot affording access to the pouch and by way of which the pet can be readily inserted and removed, slide fastener means carried by the closable and spreadable marginal edges of said slot and commensurate in length with the overall length of said slot, the forward marginal end portion only of said first opening being bordered by a smooth-finished and protective yoke, a pair of manually connectable and separable flexible neck encircling ties having like ends joined to said yoke and free ends which can be readily united or disconnected at will, said yoke comprising a firmly attached edge-bordering U-shaped bead, said like ends being secured to spaced median portions of said bead, the rearward median portions of said sidewalls being provided with vertically disposed openable and closable elongate examination and treatment slots providing convenient access, when manually opened, to the hinder quarters of the pet for (1) inserting a rectal thermometer or (2) inserting and using a hypodermic needle for whatever purposes needed, the lower sidewall portions of said bag being provided with volume diminishing and restraint means for manually and optionally gathering, contracting, and decreasing the size of the upper portion in which the pet is then snugly confined and controllably restrained for whatever purposes desired.

2. An elongated pet jacketing, temporary restraining, handling and carrying bag having complemental top, bottom, side, and front and rear end walls and defining a captive pouch, said pouch characterized by normally communicable and cooperable upper and lower portions, the upper forward portions of said sidewalls and corresponding forward portion of said top wall being provided with a first opening constituting a collar which is adapted to encompass the neck of the captive pet and to permit the head of the pet to protrude forwardly through and freely beyond said first opening, said top wall and major median portion of the rear wall having a second opening ranging lengthwise from said first opening along said top wall and terminating at a rearward end a predetermined distance above the level of said bottom wall, said second opening providing an openable and closable slot affording access to the pouch and by way of which the pet can be readily inserted and removed, slide fastener means carried by the closable and spreadable marginal edges of said slot and commensurate in length with the overall length of said slot, the lower exterior surfaces of the sidewalls having opposed coplanar open ended hems attached thereto, each hem having a complemental drawstring slidingly laced therethrough, said drawstrings being longer than the coacting hems and having free terminal ends which can be connected together for convenient use, said hems, in conjunction with said drawstrings, providing manually regulatable volume diminishing and restraint means.

3. The bag defined in and according to claim 2 and wherein a rearward median portion of at least one of said sidewalls is provided with an openable and closable elongate treatment slot providing convenient access, when intentionally opened, to the hinder quarters of the pet for (1) inserting a rectal thermometer or (2) inserting and using a hypodermic needle for whatever purposes needed.